May 24, 1938. L. V. HITSMAN ET AL 2,118,305
APPARATUS FOR TESTING PULLORUM DISEASE
Filed June 11, 1934
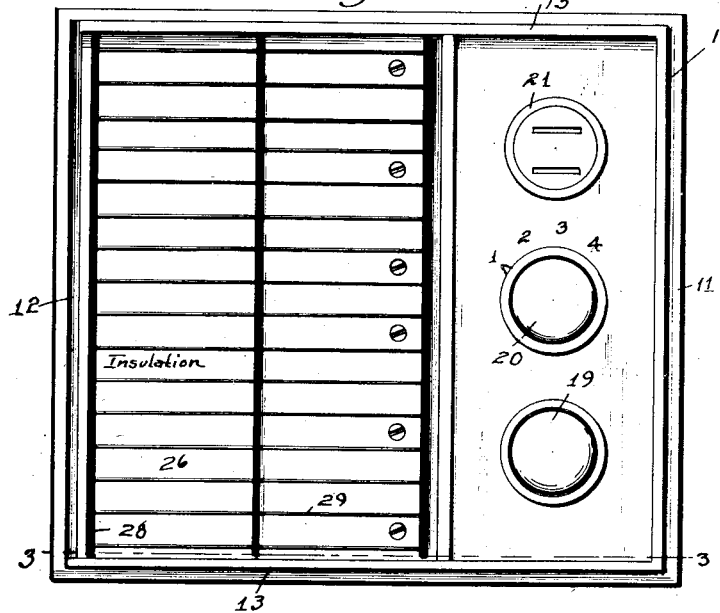
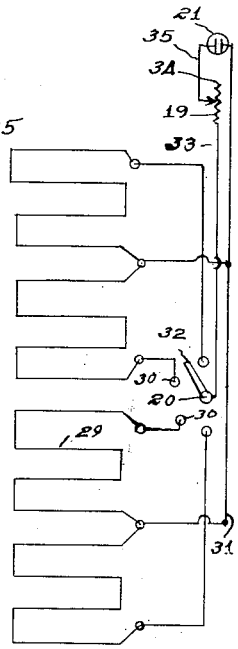
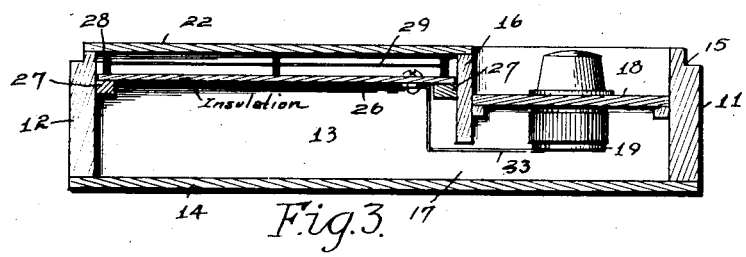
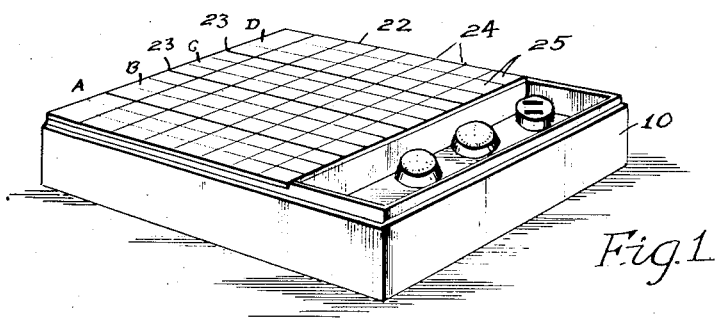
Inventors
Lester V. Hitsman
Walter E. Schultz
by Orwig & Hague Attys Patented May 24, 1938

2,118,305

UNITED STATES PATENT OFFICE 2,118,305

APPARATUS FOR TESTING PULLORUM DISEASE

Lester V. Hitsman and Walter E. Schultz, Boone, Iowa

Application June 11, 1934, Serial No. 730,032

2 Claims. (Cl. 219—19)

This invention relates to improvements in apparatus for testing pullorum disease in fowls and animals, and particularly in chickens, and relates more particularly to improvements in cabinets used in connection with testing by the method commonly known as the stained antigen whole-blood test.

Heretofore, the apparatus used in connection with making these tests consisted principally of a cabinet having a ruled or graduated slide supported on its upper surface for receiving the antigen and the blood to be tested, with means for applying sufficient heat to the test plate to warm the plate sufficiently to carry out the desired reaction, the means for applying heat to the plate consisting simply of providing a bottle of boiling hot water which was introduced in the cabinet for heating the plate.

This apparatus does not fully meet the requirements in that it is difficult to maintain the testing plate at a constant temperature, especially in cold weather, due to the fact that the hot water bottle gradually cools off after being placed in a cabinet. This results in unsatisfactory tests, as well as delaying and slowing up the testing operation. Time is also required to refill the bottle with hot water, which also takes up a considerable amount of time.

It is, therefore, the object of our invention to provide a simple, durable and inexpensive test cabinet for the purpose above described, having improved and economical means for heating the test plate wherein the temperature may be uniformly maintained, and in connection therewith, means for varying the temperature of the test plate at the will of the operator.

A further object of our invention is to provide, in connection with a test cabinet of the type above described, electrically operated heating elements, together with means for easily and quickly attaching the heating elements to the storage battery of an automobile, wherein the operator may go from one farm to another to make the desired tests, the storage battery being recharged as the automobile is driven from one point to another, thereby providing a cheap energy for producing the desired heat, and easily and quickly applied.

A further object of our invention is to provide a comparatively large testing plate whereby the testing operation may be continuously carried on on a portion of the plate while another portion of the plate is being cleaned, and in connection therewith a separate heating unit for each section or portion of the plate being heated, wherein only one portion of the plate will be heated at a time, thereby economizing in the amount of current to be derived from the storage battery for heating purposes. By this method the tester may be operated continuously for a whole day from an ordinary storage battery without discharging the battery to such an extent that it will not perform its function in starting the automobile engine.

A further object is to provide, in a test cabinet of the type above described, and in which is utilized an electrical heating element for controlling the temperature of the test plate, an improved cabinet construction wherein the heating element is supported in a compartment separate from that in which the heat controlling mechanism is supported, whereby the heat from the controlling mechanism will not materially affect the testing plate.

Our invention consists in the construction, arrangement and combination of the various parts of the device, whereby the objects contemplated are attained, as hereinafter more fully set forth, pointed out in our claims, and illustrated in the accompanying drawing, in which:

Figure 1 is a perspective view of our improved test cabinet with the cover removed, the connection cord being not illustrated.

Figure 2 is an enlarged top view of the same, with the test plate removed.

Figure 3 is a detail sectional view taken on the line 3—3 of Figure 2 showing the test plate in position.

Figure 4 is the wiring diagram of the electrical circuit.

We have used the reference numeral 10 to indicate the casing, 11 the front member, 12 the back member, 13 the side members, and 14 the bottom member of said casing, the upper edges of the members 11, 12, and 13 having a rabbet 15 to receive the cover member not illustrated, said cover member being of ordinary construction.

Supported transversely between the side members 13 is a partition 16 having its lower edge terminating above the bottom member 14 a slight distance to provide a passageway 17.

Supported horizontally between the partition 16 and the front member 11 is a horizontal instrument board 18, supported substantially midway between the upper and lower edges of the members 11 and 16, said board being designed to support a rheostat 19, a switch device 20, and a connection member 21, all of which are of ordinary construction.

Supported on top of the members 12, 13 and 16 is a test plate 22, formed preferably of glass or other transparent material, the under surface of the glass being provided with a coating of white opaque material having longitudinally extending graduation lines 23 to divide the plate into longitudinal sections A, B, C, and D. The plate is also provided with graduation lines 24 to divide the sections into test squares 25, the edges of the plate 22 being supported on and over the upper edges of the members 12, 13, and 16, so that the top surface of the plate 22 is unobstructed so that the antigen and blood placed on said plate may be removed from the entire upper surface of the plate by scraping with a sharp razor blade, or the upper surface of the plate may be washed off with water and a damp cloth, if so desired. This provides means whereby the top surface of the plate may be easily kept in a clean and sanitary condition.

Supported beneath the plate 22 is a block of insulating material 26 carried by suitable brackets 27, the upper surface of the plate 26 having a series of transversely arranged bars 28 for supporting the heating elements, these bars also being of insulating material.

The heating elements comprise resistance wires 29 which are strung back and forth between and through the members 28 in a manner clearly illustrated in Figures 2 and 4. These wires are so arranged that the heating unit is divided into a number of heating sections, one below each of the sections A, B, C, and D, one end of each of the wires 29 being connected to one of the switch points 30 of the switch device 20, while the other ends of said wires 29 are connected to a common ground wire 31 leading to one of the contact members of the connection member 21. The switch arm 32 of the switch device 20 is connected to a conductor 33 leading to the resistance element 34 of the rheostat 19, the slider of said rheostat being connected with the other terminal of the connection 21 by means of a conductor 35, as clearly illustrated in Figure 4.

By this arrangement it will be seen that by means of the switch 20 electric current from the connection 21 may be delivered to the heating element beneath either of the sections A, B, C, and D at the will of the operator, and that the amount of current delivered to said section may be varied by means of the rheostat 19. The connection element 21 is connected to the storage battery of an automobile by means of a flexible cable such as is used in connection with reading lamps and other similar devices operated from the electric light current as supplied to the lighting system of the ordinary dwelling house.

In the practical operation of our device the member 21 is connected to the storage battery of an automobile by means of a suitable flexible cable, after which the switch 20 is actuated to deliver the current to the heating element beneath one of the sections A, B, C, and D. The said section is then heated to the desired amount, said heat being controlled by the rheostat 19. The device is then ready for operation and for receiving the tests in the same manner as provided for in the ordinary test cabinet such as is disclosed in Dr. Salsbury's Poultry Health Manual, copyrighted 1933, which consists briefly in striking a drop of blood from the fowl to be tested and placing the same on one of the squares 25, then mixing with that a drop of antigen and mixing the two together, allowing it to remain a short period of time until the positive and negative action takes place, these drops of blood being placed consecutively on the squares of one of the sections of the plate 22 and the fowls placed in such position as to correspond with the positions of the drops of blood on the plate, the fowls being rejected or retained accordingly as the test shows positive and negative. This operation is continued until one of the sections is filled with tests, after which the heat is turned off from the element beneath such section and turned on to the heating element beneath an adjoining section, so that but a single section need be heated at a time, the first mentioned section being allowed to cool so that it may be cleaned without injury to the plate while tests are being made on the second section.

The antigen and blood are removed simply by scraping with a sharp instrument such as a razor blade, or by cleaning with a damp cloth. Thus means is provided whereby the fowls may be rapidly tested. The fowls may then be separated and the reactors discarded.

This apparatus is particularly adapted to be used by persons making a business of making these tests, inasmuch as the device is very light and portable, and may be easily and quickly attached, and on which the cost of upkeep is reduced to a minimum. Furthermore, the apparatus may be used either in warm or cold weather with equally good results in both cases.

By supporting the rheostat 19 and the switch device 20 in the compartment between the members 11 and 16 we have provided means whereby the heat generated by the rheostat will not materially affect the heating elements 29 or the section of the plate 22 supported above said element.

We claim as our invention:

1. In a device of the class described, the combination of a casing provided with a partition to divide the upper portion of the casing into heating and control compartments; a plate covering the heating compartment; an electric circuit including a number of heating elements beneath said plate; and means for applying electric current to any one of said elements to heat the section of said plate immediately above the element to which the current is applied and variable heat dissipating means supported in the other compartment for controlling the temperature of said heating elements whereby heat generated by the variable heat dissipating means will not affect the temperature of said plate.

2. In a device of the class described, the combination of a casing; a partition to divide the upper portion of the casing into heating and control compartments; a plate covering the heating compartment; an electric circuit including a heating element beneath said plate; and a variable resistance connected into said electric circuit and supported within said control compartment whereby heat dissipated by said variable resistance will not increase the temperature of said heating compartment.

LESTER V. HITSMAN.
WALTER E. SCHULTZ.